United States Patent
Murrish

(10) Patent No.: US 10,452,569 B2
(45) Date of Patent: Oct. 22, 2019

(54) METHODS AND SYSTEMS FOR DESIGNING A VIRTUAL PLATFORM BASED ON USER INPUTS

(71) Applicant: HONDA MOTOR CO., LTD., Tokyo (JP)

(72) Inventor: Robert Wesley Murrish, Santa Clara, CA (US)

(73) Assignee: HONDA MOTOR CO., LTD., Tokyo (JP)

( * ) Notice: Subject to any disclaimer, the term of this patent is extended or adjusted under 35 U.S.C. 154(b) by 24 days.

(21) Appl. No.: 15/800,986

(22) Filed: Nov. 1, 2017

(65) Prior Publication Data
US 2019/0129869 A1    May 2, 2019

(51) Int. Cl.
  *A63F 13/40*     (2014.01)
  *G06F 13/10*     (2006.01)
  *G06F 13/12*     (2006.01)

(52) U.S. Cl.
  CPC ............ *G06F 13/102* (2013.01); *A63F 13/40* (2014.09); *G06F 13/122* (2013.01)

(58) Field of Classification Search
  CPC combination set(s) only.
  See application file for complete search history.

(56) References Cited

U.S. PATENT DOCUMENTS

| | | | |
|---|---|---|---|
| 7,090,576 B2 | 8/2006 | Herbrich et al. | |
| 7,528,835 B2 | 5/2009 | Templeman | |
| 9,530,326 B1 | 12/2016 | Ramloll | |
| 2007/0066404 A1* | 3/2007 | Leong | A63F 3/00006 463/43 |
| 2008/0103794 A1 | 5/2008 | Pettiross et al. | |
| 2009/0112638 A1* | 4/2009 | Kneller | G06Q 10/00 705/5 |
| 2009/0276288 A1 | 11/2009 | Hlavac et al. | |
| 2017/0090589 A1* | 3/2017 | Sharma | G06F 3/017 |
| 2017/0337776 A1* | 11/2017 | Herring | G07F 17/3209 |

* cited by examiner

*Primary Examiner* — Raymond N Phan
(74) *Attorney, Agent, or Firm* — Arent Fox LLP

(57) ABSTRACT

Systems and methods for designing a virtual platform based on user inputs. The system includes a memory that stores instructions for executing processes for designing a virtual platform based on user inputs. The system also includes a processor configured to execute the instructions. The instructions cause the processor to: receive, via an input device, a plurality of user inputs; generate the virtual platform, wherein successful inputs of the virtual platform are based on the plurality of user inputs; and store the virtual platform on a storage device such that a user may utilize the virtual platform on a computing device.

20 Claims, 4 Drawing Sheets

METHODS AND SYSTEMS FOR DESIGNING A VIRTUAL PLATFORM BASED ON USER INPUTS

TECHNICAL FIELD

The present disclosure relates to methods and systems for designing a virtual platform based on user inputs.

BACKGROUND

Virtual platforms, such as video games, are commonly developed by a game designer or team of designers who are responsible for designing mechanics of the virtual platform. The mechanics may be constructs of rules or methods designed for interaction with the virtual platform. These mechanics, however, may be designed based on what the developer believe to be an appropriate input, rather than being based on actual input received from a user.

SUMMARY

This summary is provided to introduce a selection of concepts in a simplified form that are further described below in the DETAILED DESCRIPTION. This summary is not intended to identify key features of the claimed subject matter, nor is it intended to be used as an aid in determining the scope of the claimed subject matter.

In one aspect, the present disclosure is related to a system that includes a memory that stores instructions for executing processes for designing a virtual platform based on user inputs. The system also includes a processor configured to execute the instructions that cause the processor to: receive, via an input device, a plurality of user inputs; generate the virtual platform, wherein successful inputs of the virtual platform are based on the plurality of user inputs; and store the virtual platform on a storage device such that a user may utilize the virtual platform on a computing device.

In a further aspect, the present disclosure is related to a method that includes receiving, via an input device, a plurality of user inputs. The method also includes generating a virtual platform having successful inputs based on the plurality of user inputs. The method further includes storing the virtual platform on a storage device such that a user may utilize the virtual platform on a computing device.

In a further aspect, the present disclosure relates to a non-transitory computer-readable storage medium containing executable computer program code. The code includes instructions configured to cause a processor to: receive, via an input device, a plurality of user inputs; generate the virtual platform, wherein successful inputs of the virtual platform are based on the plurality of user inputs; and store the virtual platform on a storage device such that a user may utilize the virtual platform on a computing device.

BRIEF DESCRIPTION OF THE DRAWINGS

The novel features believed to be characteristic of aspects of the disclosure are set forth in the appended claims. In the description that follows, like parts are marked throughout the specification and drawings with the same numerals, respectively. The drawing figures are not necessarily drawn to scale and certain figures may be shown in exaggerated or generalized form in the interest of clarity and conciseness. The disclosure itself, however, as well as a preferred mode of use, further objects and advances thereof, will be best understood by reference to the following detailed description of illustrative aspects of the disclosure when read in conjunction with the accompanying drawings, wherein:

DETAILED DESCRIPTION

The following includes definitions of selected terms employed herein. The definitions include various examples and/or forms of components that fall within the scope of a term and that may be used for implementation. The examples are not intended to be limiting.

A "processor," as used herein, processes signals and performs general computing and arithmetic functions. Signals processed by the processor may include digital signals, data signals, computer instructions, processor instructions, messages, a bit, a bit stream, or other computing that may be received, transmitted and/or detected.

A "bus," as used herein, refers to an interconnected architecture that is operably connected to transfer data between computer components within a singular or multiple systems. The bus may be a memory bus, a memory controller, a peripheral bus, an external bus, a crossbar switch, and/or a local bus, among others. The bus may also be a vehicle bus that interconnects components inside a vehicle using protocols, such as Controller Area network (CAN), Local Interconnect Network (LIN), among others.

A "memory," as used herein may include volatile memory and/or non-volatile memory. Non-volatile memory may include, for example, ROM (read only memory), PROM (programmable read only memory), EPROM (erasable PROM) and EEPROM (electrically erasable PROM). Volatile memory may include, for example, RAM (random access memory), synchronous RAM (SRAM), dynamic RAM (DRAM), synchronous DRAM (SDRAM), double data rate SDRAM (DDR SDRAM), and/or direct RAM bus RAM (DRRAM).

An "operable connection," as used herein may include a connection by which entities are "operably connected", is one in which signals, physical communications, and/or logical communications may be sent and/or received. An operable connection may include a physical interface, a data interface and/or an electrical interface.

Figure 1:
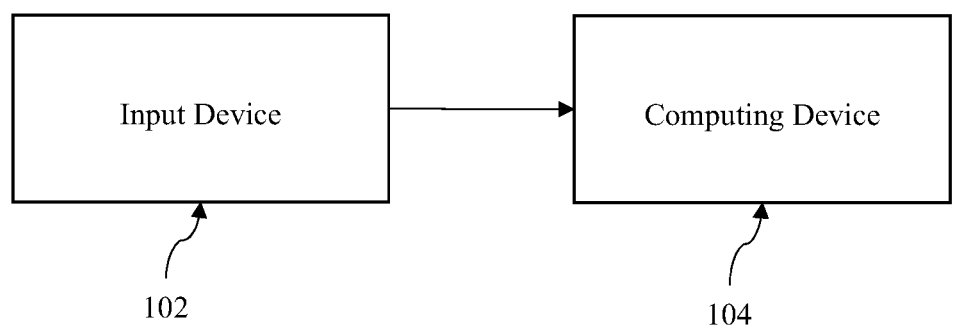
FIG. 1 illustrates an exemplary operating environment for designing a virtual platform based on user inputs in accordance with aspects of the present disclosure.

Generally described, the present disclosure provides systems and methods for designing a virtual platform based on user inputs. FIG. 1 illustrates an exemplary operating environment for designing a virtual platform based on user inputs in accordance with aspects of the present disclosure. The operating environment includes an input device 102 for receiving inputs from a user and a computing device for processing the user inputs received from the input device 102 to generate the virtual platform.

In some aspects, the input device 102 may be, for example, a gamepad or controller, a steering wheel and vehicle pedals, a joystick, a motion capture device, keyboard etc., for receiving inputs from a user. Other input devices are further contemplated in accordance with aspects of the present disclosure. In some aspects, the user may be a professional within a field (e.g., a professional race car driver, an architect, a stunt expert, a professional dancer/choreographer, a medical professional, etc.), a layman, or an individual with learning disabilities.

Figure 2:
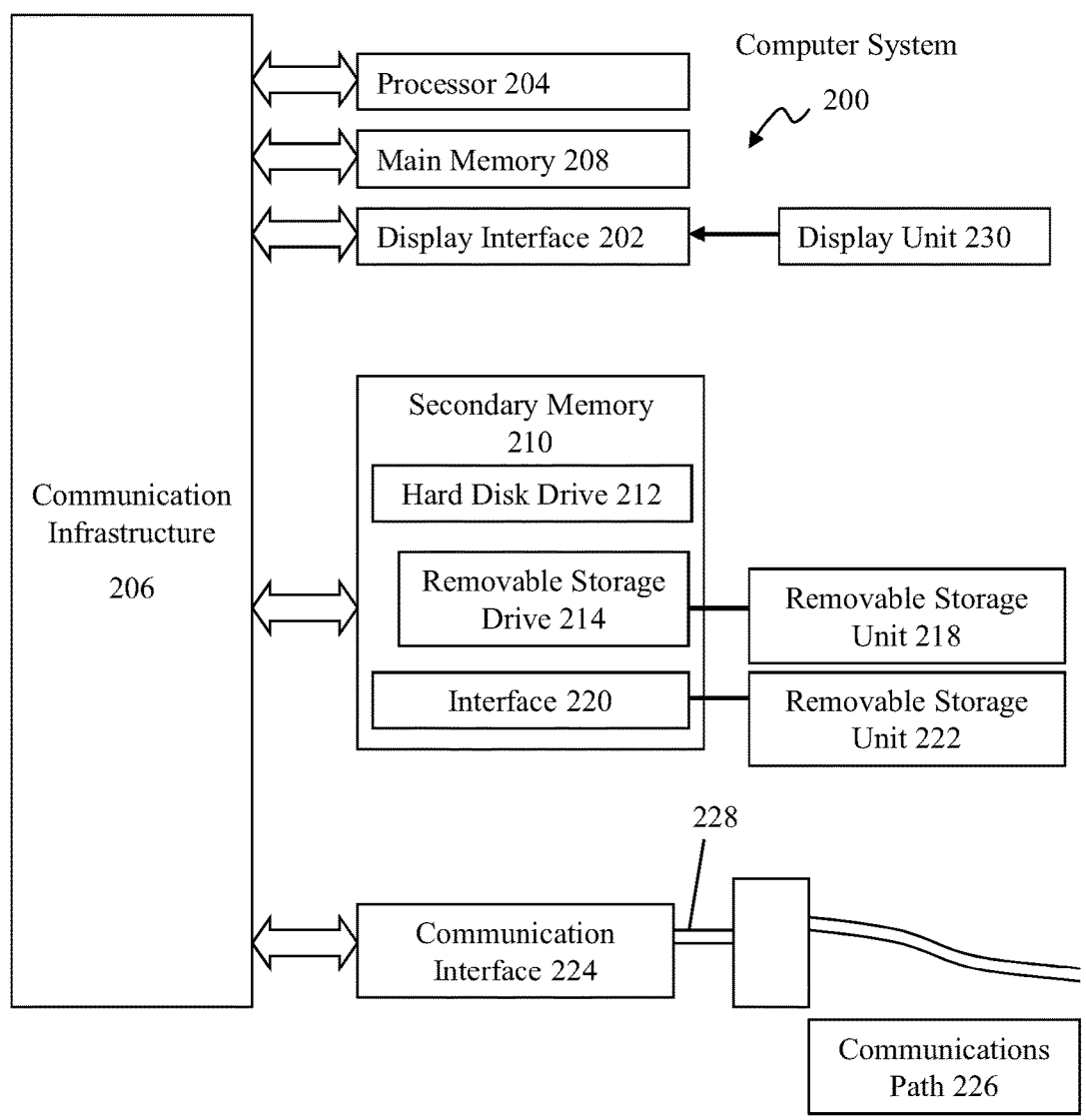
FIG. 2 illustrates various features of an exemplary computer system for use in conjunction with aspects of the present disclosure.

The computing device 104 may include a computer system 200, as shown with respect to FIG. 2 described below. The computer system 200 may also include a memory that stores instructions for executing processes for generating the virtual platform and a processor configured to execute the instructions. The memory may be local to the computer system 200 or remote.

In some aspects, the virtual platform may be, for example, a racing game, a fighting game, a first-person style game, a puzzle game, a side-scrolling game, a maze, or a falling-brick type game. In further aspects, the virtual platform may be a building design. For example, a user with a motion capture device may input an ideal path from one room to another, and this ideal path may be used to generate a virtual building design satisfying those inputs. In still further aspects, the virtual platform may be used for choreography planning. For example, a user with a motion capture device may perform choreographed maneuvers, such as stunts/special effects and/or other artistic maneuvers, and these inputs may be used to create a virtual training platform where a trainee's input is compared to the virtual training platform. These are merely examples of virtual platforms contemplated by the present disclosure. Other virtual platforms are further contemplated in accordance with aspects of the present disclosure.

In further aspects, the inputs from the user may be transmitted from the input device 102 to the computing device 104. Upon receipt of the user inputs, the computing device 104 may process the user inputs to identify successful inputs for the virtual platform. For example, the successful inputs may be inputs required to successfully complete the virtual universe, e.g., the inputs required to "win," or to complete at least a portion of or an objective within the virtual universe. In some aspects, the computing device 104 may generate a virtual platform requiring a one-to-one match between the user inputs and the successful inputs. As one example, the user may provide inputs for generating a maze or a puzzle with a single solution, such that the successful inputs would be valid upon matching the user inputs.

In another example, the successful inputs may be inputs that provide an enjoyable user experience without requiring a one-to-one match between the user inputs and the successful inputs. In further aspects, the computing device 104 may generate the virtual platform based on common features extracted from the user inputs. In this way, the virtual platform may be generated such that the successful inputs may be similar to the user inputs without requiring the input stream to match the user inputs in order to be valid. To extract the common features, the computing device 104 may utilize machine learning algorithms to identify common features of the user inputs over any number of iterations. As one example, when receiving inputs for a race car game, the user may provide inputs for a turn over multiple laps including a steering angle, brake modulation, and/or throttle modulation. Alternatively, or in addition, the user may provide an input, e.g., counter-steering, when attempting to perform a maneuver, such as drifting a car.

As another example, the inputs may be provided by an individual with a learning disability or disease that affects motor skills, and the computing device 104 may identify common features of the individual with the learning disability, such that the individual with a learning disability may succeed while utilizing the virtual platform whenever their inputs closely resemble the original inputs. In yet another example, a first user, e.g., a medical professional or a caregiver, may provide inputs that mimic the motor skills of a second user, e.g., another individual with a learning disability or disease that affects motor skills. In some aspects, the inputs from the first user may mimic the motor skills of a particular second user or the inputs from the first user may mimic the motor skills that are commonly exhibited by individuals with a given learning disability/disease. Based on the inputs from the medical professional/caregiver, the computing device 104 may generate the virtual platform having successful inputs that share common features of the received inputs. In this way, any individual with a learning disability may succeed when playing the virtual platform.

In some aspects, the machine learning algorithms may include one or more clustering techniques, such as k-means clustering, for example. K-means clustering is merely one example of machine learning clustering techniques contemplated by the present disclosure. Other machine learning clustering techniques are further contemplated in accordance with aspects of the present disclosure. Using the clustering techniques, the computing device 104 may identify a plurality of inputs for any number of characteristics and partition the plurality of inputs into sets. Using the race car game as an example, the computing device 104 may identify a plurality of inputs for the steering angle, a plurality of inputs for the brake modulation, and/or a plurality of inputs for the throttle modulation, and partition the plurality of inputs for each of the steering angle, brake modulation, and/or the throttle modulation into sets for each input. In some aspects, the computing device 104 may determine an average for a given input based on the partitioned sets to select the successful input for the virtual platform. In other aspects, the computing device 104 may select the successful input based on a value different from the average. For example, to create a virtual platform where it may be more challenging to succeed, the computing device 104 may select the successful input that is above the average of the partitioned sets. In another example, to create a virtual platform where it may be less challenging to succeed, the computing device 104 may select the successful input that is based on a partition set having the highest number of occurrences or select the successful input that is below the average of the partitioned sets.

In some aspects, using the clustering techniques, the computing device 104 may cluster the plurality of inputs based on the type of input device 102 being used. For example, again using the race car game as an example, a user using the steering wheel and vehicle pedals may provide more precise inputs than a user using, for example, the gamepad/controller, the joystick, or the keyboard. By clustering the inputs based on the particular type of input device 102 being used, the computing device 104 may generate the virtual platform tailored for the specific type of input device 102. In further aspects, the computing device 104 may apply a filter to the inputs from the different types of input devices 102, such that the inputs from the different types of input devices 102 may be agnostic to the computing device 104, and as a result, the computing device 104 may generate the virtual platform irrespective of the type of input device 102 being used.

Figure 4:
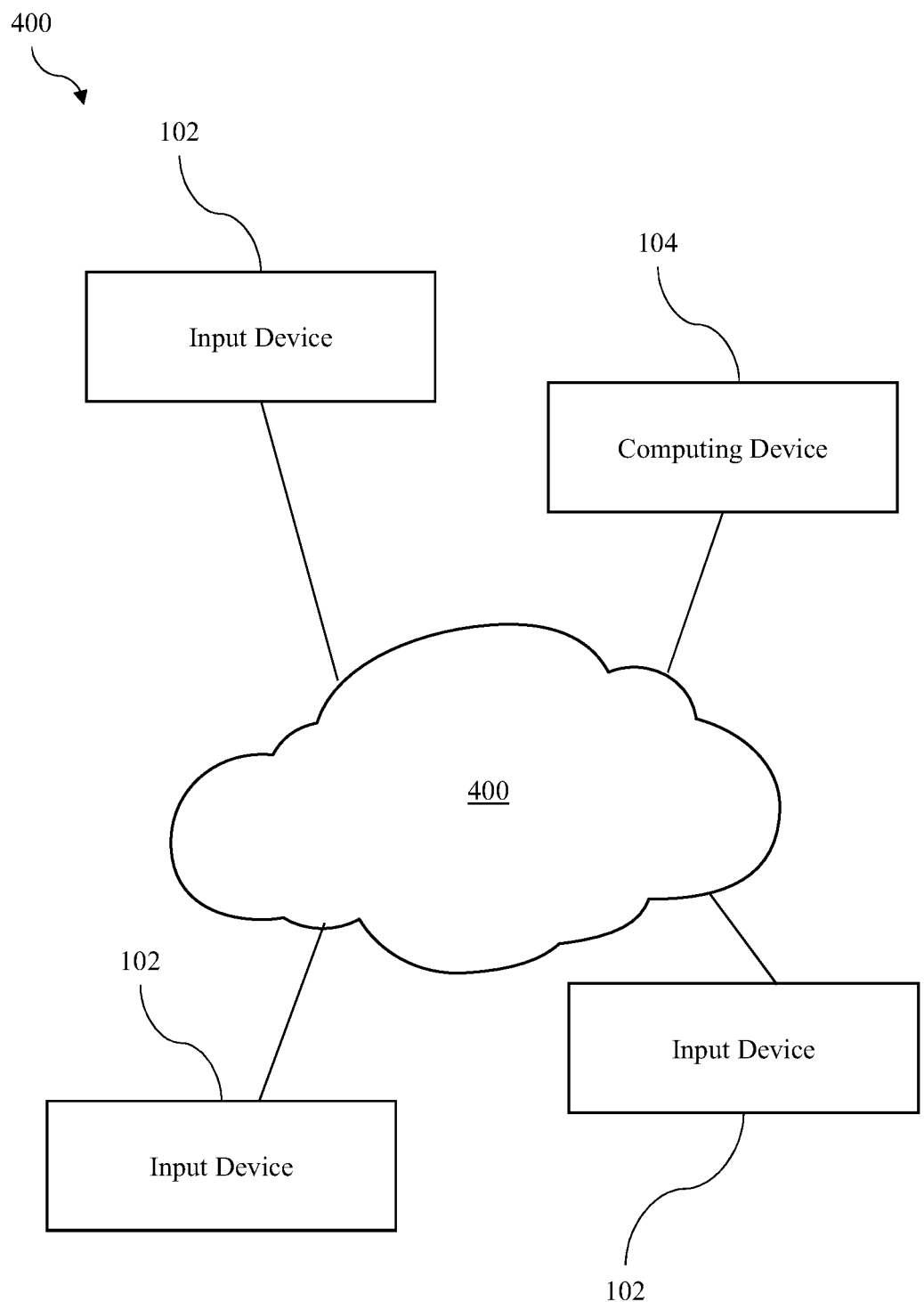
FIG. 4 illustrates an exemplary network for receiving inputs from a plurality of users over a network, in accordance with aspects of the present disclosure.

In further aspects, the virtual platform may be generated based on inputs from a plurality of users. To achieve this, the computing device 104 may receive inputs from each of the plurality of users and extract the common features. In some aspects, the plurality of users may provide the inputs over an exemplary network 400, as illustrated in FIG. 4. The network 400 may be a communications network that facilitates communications between multiple systems. For example, the network 400 may include the Internet or another Internet Protocol (IP) based network. The network 400 may enable the plurality of user to provide inputs via a respective input device 102 to the computing device 104. In other aspects, the plurality of users may provide the user inputs via a common input device 102 to the computing device 104.

In some aspect, the plurality of users may be, for example, one or more experts, one or more skilled gamers, one or more causal gamers, or any combination thereof. In some aspects, the computing device 104 may aggregate the inputs from each of the plurality of users and extract the common features from the aggregated inputs, as described herein. In turn, the computing device 104 may determine the successful inputs for the virtual platform, as described herein, such that the virtual platform is ubiquitous to all of the plurality users.

In further aspects, the computing device 104 may separate the plurality of users into separate classes with each class of users having a different skill level and/or expectations with regard to a gaming experience, e.g., the experts may be separated into a first class, the skilled gamers may be separated into a second class, and the casual gamers may be separated into a third class. In some aspects, the computing device 104 may aggregate the inputs from each class of users separately and extract the common features from the aggregated inputs for each class of users. In turn, the computing device 104 may determine the successful inputs for the virtual platform for each class, as described herein, such that the virtual platform is tailored for each class of the plurality users.

After determining the successful inputs for the virtual platform, the computing device 104 may generate the virtual platform and store the platform on a memory. In this way, the virtual platform may be executed on the computing device 104 or another computing device.

Computer system 200 includes one or more processors, such as processor 204. The processor 204 is connected to a communication infrastructure 206 (e.g., a communications bus, cross-over bar, or network). Various software aspects are described in terms of this example computer system. After reading this description, it will become apparent to a person skilled in the relevant art(s) how to implement aspects of the disclosure using other computer systems and/or architectures.

Computer system 200 may include a display interface 202 that forwards graphics, text, and other data from the communication infrastructure 206 (or from a frame buffer not shown) for display on a display unit 230. Computer system 200 also includes a main memory 208, preferably random access memory (RAM), and may also include a secondary memory 210. The secondary memory 210 may include, for example, a hard disk drive 212, and/or a removable storage drive 214, representing a floppy disk drive, a magnetic tape drive, an optical disk drive, a universal serial bus (USB) flash drive, etc. The removable storage drive 214 reads from and/or writes to a removable storage unit 218 in a well-known manner. Removable storage unit 218 represents a floppy disk, magnetic tape, optical disk, USB flash drive etc., which is read by and written to removable storage drive 214. As will be appreciated, the removable storage unit 218 includes a computer usable storage medium having stored therein computer software and/or data.

Alternative aspects of the present disclosure may include secondary memory 210 and may include other similar devices for allowing computer programs or other instructions to be loaded into computer system 200. Such devices may include, for example, a removable storage unit 222 and an interface 220. Examples of such may include a program cartridge and cartridge interface (such as that found in video game devices), a removable memory chip (such as an erasable programmable read only memory (EPROM), or programmable read only memory (PROM)) and associated socket, and other removable storage units 222 and interfaces 220, which allow software and data to be transferred from the removable storage unit 222 to computer system 200.

Computer system 200 may also include a communications interface 224. Communications interface 224 allows software and data to be transferred between computer system 200 and external devices. Examples of communications interface 224 may include a modem, a network interface (such as an Ethernet card), a communications port, a Personal Computer Memory Card International Association (PCMCIA) slot and card, etc. Software and data transferred via communications interface 224 are in the form of signals 228, which may be electronic, electromagnetic, optical or other signals capable of being received by communications interface 224. These signals 228 are provided to communications interface 224 via a communications path (e.g., channel) 226. This path 226 carries signals 228 and may be implemented using wire or cable, fiber optics, a telephone line, a cellular link, a radio frequency (RF) link and/or other communications channels. In this document, the terms "computer program medium" and "computer usable medium" are used to refer generally to media such as a removable storage drive 218, a hard disk installed in hard disk drive 212, and signals 228. These computer program products provide software to the computer system 200. Aspects of the present disclosure are directed to such computer program products.

Computer programs (also referred to as computer control logic) are stored in main memory 208 and/or secondary memory 210. Computer programs may also be received via communications interface 224. Such computer programs, when executed, enable the computer system 200 to perform the features in accordance with aspects of the present disclosure, as discussed herein. In particular, the computer programs, when executed, enable the processor 204 to perform the features in accordance with aspects of the present disclosure. Accordingly, such computer programs represent controllers of the computer system 200.

In an aspect of the present disclosure where the disclosure is implemented using software, the software may be stored in a computer program product and loaded into computer system 200 using removable storage drive 214, hard drive 212, or communications interface 220. The control logic (software), when executed by the processor 204, causes the processor 204 to perform the functions described herein. In another aspect of the present disclosure, the system is implemented primarily in hardware using, for example, hardware components, such as application specific integrated circuits (ASICs). Implementation of the hardware state machine so as to perform the functions described herein will be apparent to persons skilled in the relevant art(s).

Figure 3:
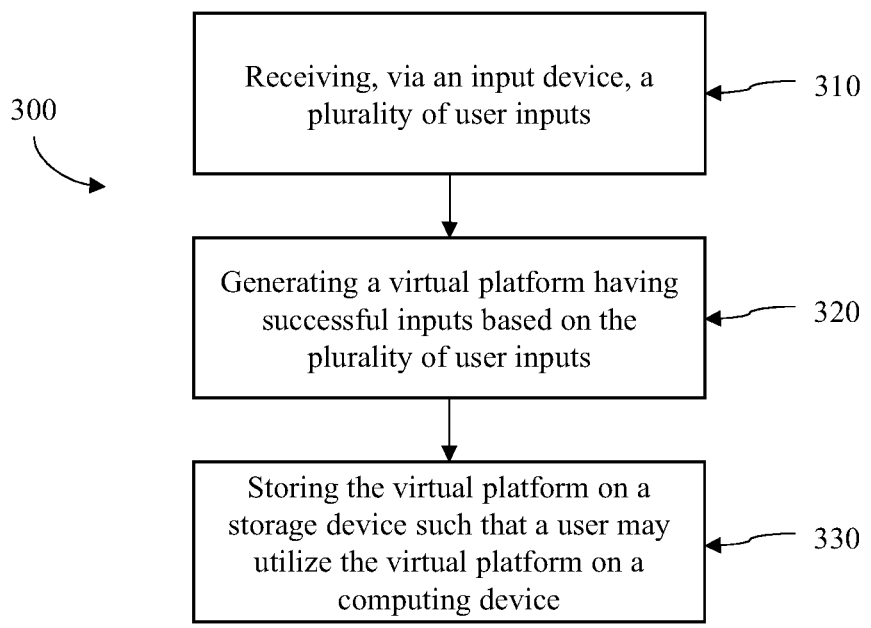
FIG. 3 illustrates a flowchart for designing a virtual platform based on user inputs.

FIG. 3 illustrates a flowchart for designing a virtual platform based on user inputs. A method 300 includes receiving, via an input device, a plurality of user inputs 310. The method also includes generating a virtual platform having successful inputs based on the plurality of user inputs 320. The method further includes storing the virtual platform on a storage device such that a user may utilize the virtual platform on a computing device 330.

It will be appreciated that various implementations of the above-disclosed and other features and functions, or alternatives or varieties thereof, may be desirably combined into many other different systems or applications. Also that various presently unforeseen or unanticipated alternatives, modifications, variations, or improvements therein may be subsequently made by those skilled in the art which are also intended to be encompassed by the following claims.

What is claimed is:

1. A system comprising:
a memory that stores instructions for executing processes for designing a virtual platform based on user inputs; and
a processor configured to execute the instructions, wherein the instructions cause the processor to:
receive, via an input device, a plurality of user inputs;
in response to receiving the plurality of user inputs, generate the virtual platform having one or more successful inputs, wherein the one or more successful inputs of the virtual platform are based on the plurality of user inputs; and
store the virtual platform on a storage device such that a user may utilize the virtual platform on a computing device.

2. The system of claim 1, wherein the successful inputs match an entire sequence of the plurality of user inputs.

3. The system of claim 1, wherein the instructions further cause the processor to extract common features from the plurality of user inputs over a number of iterations of receiving the plurality of user inputs via the input device.

4. The system of claim 1, wherein the input device comprises a plurality of input devices of different types, and the instructions further cause the processor to:
cluster the plurality of user inputs based on the type of input device; and
generate the virtual platform tailored for each type of input device based on the clustered plurality of user inputs.

5. The system of claim 1, wherein receiving the plurality of user, inputs comprises receiving the plurality of user inputs from a plurality of users, and the instructions further cause the processor to:
aggregate the plurality of user inputs from the plurality of users;
extract common features from the aggregated user inputs by clustering the aggregated plurality of inputs to identify the common features; and
determine the successful inputs for the virtual platform based on the extracted common features.

6. The system of claim 1, wherein receiving the plurality of user inputs comprises receiving the plurality of user inputs from a plurality of users, and the instructions further cause the processor to:
separate the plurality of users into separate classes;
aggregate the plurality of inputs from each class of users separately;
extract common features from the aggregated user inputs for each class by clustering the aggregated plurality of inputs to identify the common features; and
determine the successful inputs for the virtual platform for each class of users.

7. The system of claim 3, wherein extracting the common features comprises clustering the plurality of inputs to identify the common features.

8. The system of claim 3, wherein the successful inputs are based on the common features.

9. A method comprising:
receiving, via an input device, a plurality of user inputs;
in response to receiving the plurality of user inputs, generating the virtual platform having one or more successful inputs, wherein the one or more successful inputs of the virtual platform are based on the plurality of user inputs; and
storing the virtual platform on a storage device such that a user may utilize the virtual platform on a computing device.

10. The method of claim 9, wherein the successful inputs match an entire sequence of the plurality of user inputs.

11. The method of claim 9, further comprising extracting common features from the plurality of user inputs over a number of iterations of receiving the plurality of user inputs via the input device.

12. The method of claim 9, wherein the input device comprises a plurality of input devices of different types, and the method further comprises:
clustering the plurality of user inputs based on the type of input device; and
generating the virtual platform tailored for each type of input device based on the clustered plurality of user inputs.

13. The method of claim 9, wherein receiving the plurality of user inputs comprises receiving the plurality of user inputs from a plurality of users, and the method further comprises:
aggregating the plurality of user inputs from the plurality of users;
extracting common features from the aggregated user inputs by clustering the aggregated plurality of inputs to identify the common features; and
determining the successful inputs for the virtual platform based on the extracted common features.

14. The method of claim 9, wherein receiving the plurality of user inputs comprises receiving the plurality of user inputs from a plurality of users, and the method further comprises:
separating the plurality of users into separate classes;
aggregating the plurality of inputs from each class of users separately;
extracting common features from the aggregated user inputs for each class by clustering the aggregated plurality of inputs to identify the common features; and
determining the successful inputs for the virtual platform for each class of users.

15. The method of claim 11, wherein extracting the common features comprises clustering the plurality of inputs to identify the common features.

16. The method of claim 15, wherein the successful inputs are based on the common features.

17. A non-transitory computer-readable storage medium containing executable computer program code, the code comprising instructions configured to cause a processor to:
receive, via an input device, a plurality of user inputs;
in response to receiving the plurality of user inputs, generate the virtual platform having one or more successful inputs, wherein the one or more successful inputs of the virtual platform are based on the plurality of user inputs; and
store the virtual platform on a storage device such that a user may utilize the virtual platform on a computing device.

18. The medium of claim 17, wherein the instructions further cause the processor to extract common features from the plurality of user inputs over a number of iterations of receiving the plurality of user inputs via the input device by clustering the plurality of inputs to identify the common features, and wherein the successful inputs are based on the common features.

19. The medium of claim 17, wherein the input device comprises a plurality of input devices of different types, and the instructions further cause the processor to:
   cluster the plurality of user inputs based on the type of input device; and
   generate the virtual platform tailored for each type of input device based on the clustered plurality of user inputs.

20. The medium of claim 17, wherein receiving the plurality of user inputs comprises receiving the plurality of user inputs from a plurality of users, and the instructions further cause the processor to:
   aggregate the plurality of user inputs from the plurality of users;
   extract common features from the aggregated user inputs by clustering the aggregated plurality of inputs to identify the common features; and
   determine the successful inputs for the virtual platform based on the extracted common features.

* * * * *